United States Patent [19]
Asano et al.

[11] Patent Number: 5,233,587
[45] Date of Patent: Aug. 3, 1993

[54] ROTARY-TYPE OPTICAL HEAD

[75] Inventors: Takayuki Asano; Isao Hoshino, both of Yokohama, Japan

[73] Assignee: Kabushiki Kaisha Toshiba, Kawasaki, Japan

[21] Appl. No.: 723,320

[22] Filed: Jun. 28, 1991

[30] Foreign Application Priority Data

Jun. 29, 1990 [JP] Japan ............................ 2-170202
Jun. 29, 1990 [JP] Japan ............................ 2-173078
Sep. 12, 1990 [JP] Japan ............................ 2-239887

[51] Int. Cl.$^5$ .......................................... G11B 7/00
[52] U.S. Cl. .............................. 369/44.42; 369/44.19
[58] Field of Search .................. 369/32, 44.41, 44.17, 369/44.19, 44.21, 44.42

[56] References Cited

U.S. PATENT DOCUMENTS 4,815,060 3/1989 Nomura ........................... 369/44.42
5,136,567 8/1992 Nagahara et al. ................ 369/44.41

FOREIGN PATENT DOCUMENTS 57-18247 4/1982 Japan .

OTHER PUBLICATIONS

Ishibashi, et al. "Magneto-Optic Disk Drive of High Speed Track Accessability", International Symposium on Optical Memory, 1987, pp. 17-20.

Primary Examiner—Donald E. McElheny, Jr.
Attorney, Agent, or Firm—Oblon, Spivak, McClelland, Maier & Neustadt

[57] ABSTRACT

An optical head which can be rotated about the rotation center by a magnetic force. There is a photodetector which is divided into a plurality of detection regions and as the optical head rotates, different detection regions are examined to determine a tracking error. Rotating between the inner and outer peripheral portions of an optical disk, the optical head selects a track on the optical disk on which information is recorded, radiates a light beam focused on the selected track, receives the light beam reflected by the optical disk to a second photodetector having three divided parallel sensor segments, and reproduces the information recorded on the optical disk. In consideration of the fact that in an optical disk rotated at a constant angular velocity, the degree of modulation of a retrieving information signal recorded on a recording layer on the optical disk is increased toward the outer peripheral portion, the sensor segments of the photodetector are arranged such that the projection of a track on the inner peripheral portion in an information recording area, of track projections which move on the sensor segments, does not cross the three divided sensor segments upon rotation of the optical head.

5 Claims, 14 Drawing Sheets

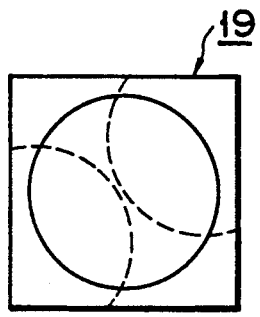 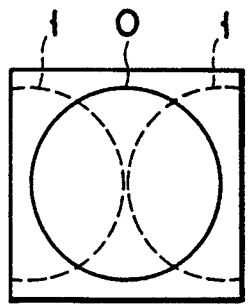 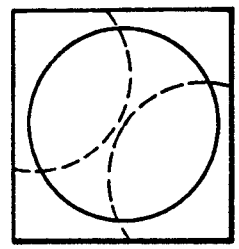
INNER TRACK  CENTER TRACK  OUTER TRACK
FIG.5(a)     FIG.5(b)      FIG.5(c)
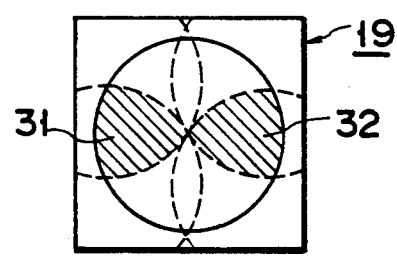
FIG. 6

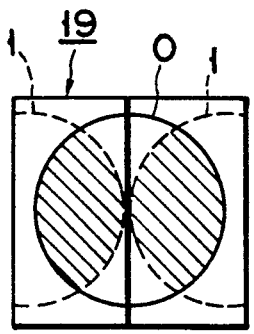
FIG. 7
PRIOR ART
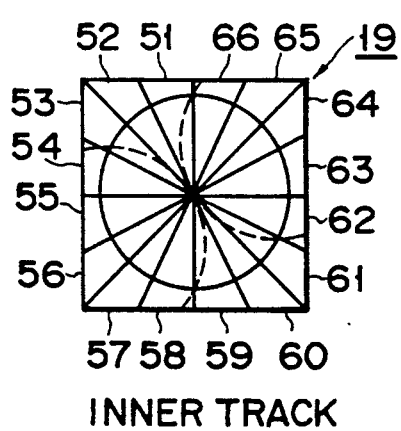 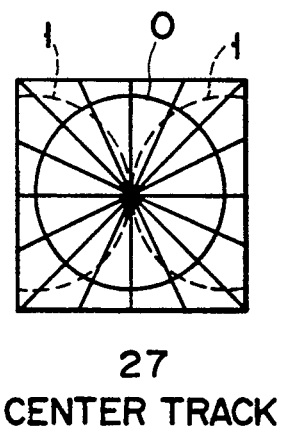 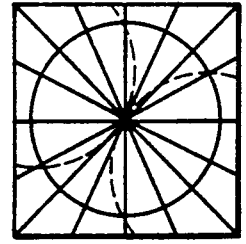
INNER TRACK         CENTER TRACK        OUTER TRACK
FIG.8(a)            FIG.8(b)            FIG.8(c)

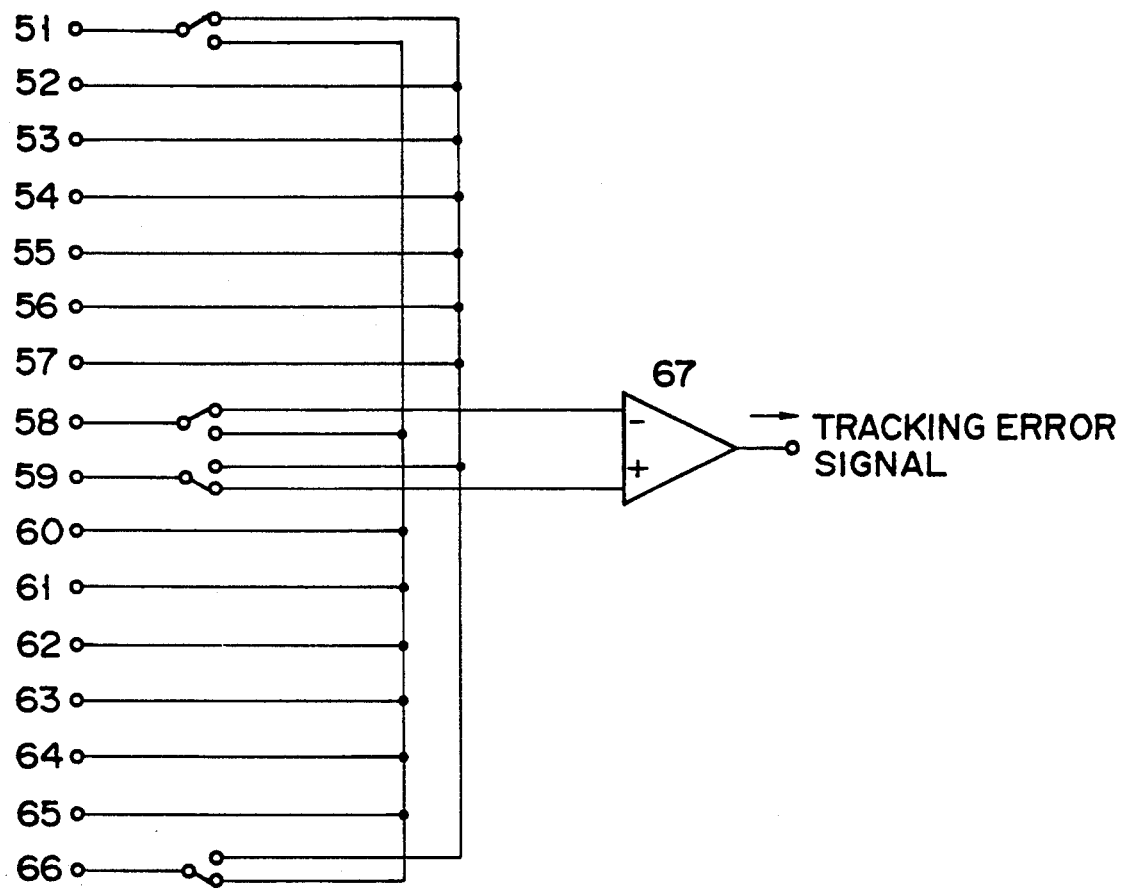
F I G. 10

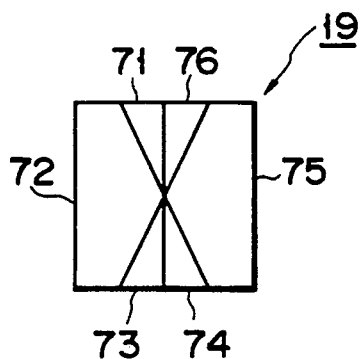
F I G. 11
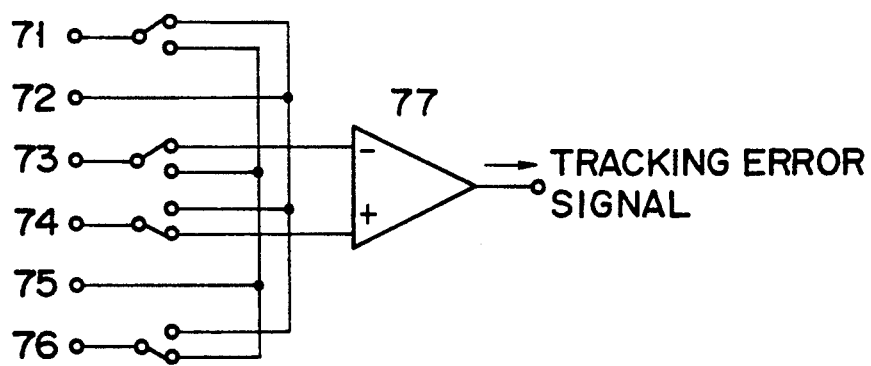
F I G. 12

ROTARY-TYPE OPTICAL HEAD

BACKGROUND OF THE INVENTION

1. Field of the Invention

The present invention relates to an optical head used for an optical memory apparatus for recording/reproducing information on/from an optical disk by light beams thereon and, more particularly, to a rotary-type optical head which traces tracks while rotating by oneself above an optical disk.

2. Description of the Related Art

Optical memory apparatuses for recording/reproducing information by using optical disks have recently been widely used. In such optical memory apparatuses, information signals are recorded/reproduced by tracing spiral grooves formed in an optical disk with a laser beam emitted from an optical disk. This laser beam is focused on a recording layer by an objective lens to have a small beam spot having a diameter of about 1 μm. If the optical disk is deflected, the focusing position of the beam spot is deviated from a proper position on the information recording medium. This is called a focusing error. In addition, if the center of a spiral groove is shifted from the rotation center of the optical disk (called "radial runout"), the groove and the beam spot are shifted from each other upon rotation of the optical disk. This is called a tracking error. In order to control these errors, the optical head includes an error detection system and a control mechanism for controlling the position of the beam spot on the basis of servo error signals (i.e., a focusing error signal, a tracking error signal, and the like) generated by detection outputs from the error detection system. If the beam spot is accurately controlled on the recording layer, information signals can be recorded/reproduced with high reliability.

Error detection is generally performed in the following manner. Light reflected by an optical disk is detected by using a photodetector having several divided sensor segments. Output signals corresponding to the respective sensor segments are then subjected to arithmetic processing such as addition and subtraction, thus detecting an error. For example, as a method of focusing error detection, a detection method shown in FIGS. 15(a) and 15(b) is known. Referring to FIG. 15(a), light reflected by an optical disk is converged by a convergent lens 81. If the optical disk is shifted from the position of a beam spot focused by an objective lens, the reflected light from the optical disk is incident, as convergent or divergent light, on the convergent lens 81. For this reason, the converging position of the light beam transmitted through the convergent lens 81 is changed. This change in focusing position of a light beam is detected by arranging photodetectors 82 and 83, each having three divided sensor segments 29a to 29c shown in FIG. 15(b) at positions separated from the focal point of the convergent lens 81 by the same distance, thus detecting a change in size of the light beam. Tracking control of a conventional optical head is performed by controlling the current amount of a tracking coil 84 to move the objective lens in a direction perpendicular to the tracks. With this operation, a light beam on a photodetector surface moves in accordance with an eccentricity amount. The three divided sensor segments of the photodetector are sequentially arranged in the track direction so as to minimize a focusing error detection offset caused upon movement of the light beam. In this arrangement, an information signal in reproduction is influenced by non-detecting regions (to be referred to as split regions hereinafter) between the three divided sensor segments 29a to 29c, resulting in a deterioration in frequency characteristics of the retrieving information signal.

In addition, as a method of detecting a tracking error, a method shown in FIG. 7 is known. In this method, a photodetector having two divided sensor segments in a direction perpendicular to the tracks is arranged to divide a light beam. A tracking error is detected by subtracting output signals from the two sensor segments from each other. This detection method is a typical tracking error detection method called "push-pull detection method". A region where "diffracted light" and "0th-order light" from a groove in an optical disk overlap (indicated by hatching) is a region where a light amount change caused by a track shift is large.

FIG. 17 is a perspective view showing an outer appearance of an optical head which is driven to be freely rotated about a shaft so as to selectively trace tracks on an optical disk.

According to a rotary-type optical head, upon rotation of the optical head, the projection of a track on an optical disk is rotated on a photodetector. When the projection of the track is rotated, a portion where "diffracted light" and "0th-order light" overlap is also rotated. As a result, a tracking error signal changes. However, according to a rotary-type optical head based on another scheme in which a detection optical system for guiding reflected light from an optical disk to a photodetector is arranged in a fixed optical system which is not rotated with the optical head, since the projection of a track is only slightly rotated on the photodetector, tracking error detection is not much influenced by the rotation of the projection. In contrast to this, in the rotary-type optical head having a compact arrangement in which the overall optical system including the detection optical system is integrated in a rotation drum, since the projection of a track is excessively rotated on the photodetector, tracking error detection is greatly influenced by the rotation. As a result, an accurate tracking error signal cannot be obtained As described above, it is especially difficult to reproduce accurate information from pits at an inner zone of an optical disk designed to be rotated at a constant angular velocity, because the size of each pin at the inner zone is smaller than that at an outer zone. In addition, as the rotation amount of the projection of a track on the photodetector is increased upon rotation of the rotation drum, an accurate tracking error signal cannot be obtained.

SUMMARY OF THE INVENTION

It is an object of the present invention to provide an optical head which can improve the frequency characteristics of a retrieving information signal at an inner zone of an optical disk so as to accurately reproduce information, and can obtain an accurate tracking error signal.

In order to achieve the above object, according to the present invention, an optical head is designed as follows.

Rotating about a rotation center and moving between the inner and outer zone of an optical disk, the optical head selects a track, on the optical disk, on which information is recorded, radiates a light beam focused on the selected track, receives the light beam reflected by the optical disk through a photodetector having three divided parallel sensor segments, and reproduces the information recorded on the optical disk. In consideration of the fact that in a optical disk rotated at a constant angular velocity, the degree of modulation of a retrieving information signal recorded on a recording layer on the optical disk is increased toward the outer peripheral portion, the sensor segments of the photodetector are arranged such that the projection of a track at the inner zone in an information recording area, of track projections which move on the sensor segments, does not cross the three divided sensor segments upon rotation of the optical head.

In a photodetector for detecting a tracking error signal, which is arranged on the rotating member which can be rotated in a direction to cross the tracks on the optical disk, regions where the spots of "0th-order light" and "diffracted light" of light reflected by the optical disk commonly overlap upon rotation of the rotating member are set as detection regions for detecting a tracking error signal.

Furthermore, the present invention is characterized in that the detection regions are changed in accordance with the rotation of the rotating member. More specifically, there are two regions where the spots of "0th-order light" and "diffracted light" of light reflected by the optical disk overlap, and a tracking error signal is detected by obtaining a difference between outputs from these two detection regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5(a) to 5(c) are views, respectively showing regions, for explaining the movement of a "diffracted light spot", reflected by an optical disk, on a photodetector for tracking error signal detection, upon rotation of the optical head;

FIG. 6 is a view showing the detection regions of the photodetector for tracking error signal detection in the embodiment;

FIG. 7 is a view, showing the detection regions of a photodetector, for explaining the principle of tracking error signal detection in a prior art;

FIGS. 8(a) to 8(c) are views respectively showing the detection regions of the photodetector for tracking error detection according to an embodiment of the present invention;

FIG. 10 is a circuit diagram showing a tracking operation circuit according to the present invention;

FIG. 11 is a view showing the detection regions of another detector for tracking error detection according to the present invention;

FIG. 12 is a circuit diagram showing a tracking operation circuit connected to the photodetector in FIG. 11;

DETAILED DESCRIPTION OF THE PREFERRED EMBODIMENTS

An optical head of the present invention is characterized in that the quality of information reproduction signals on the inner peripheral side of an optical disk is improved by devising the arrangement of photodetectors having a plurality of sensor segments and used for focusing error detection.

Figure 1:
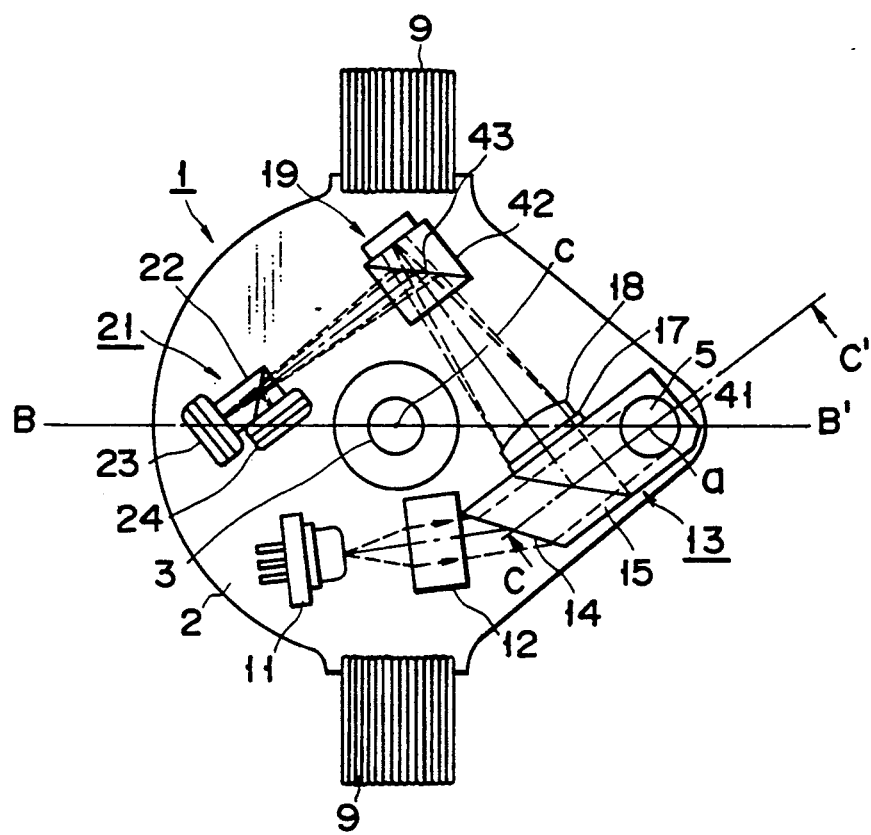
FIG. 1 is a plan view showing an arrangement of an optical head according to an embodiment of the present invention.

Referring to FIG. 1, all the optical systems required for a rotary-type optical head are arranged above a rotation drum 2. Coils 9 are symmetrically arranged on both sides (upper and lower sides in FIG. 1) of the rotation drum 2.

An optical system in the rotation drum 2 is arranged in accordance with the transmission path of light and is operated in the following manner. A light beam emitted from a laser diode 11 is collimated by a collimating lens 12 and is incident on a composite optical unit 13. An entrance plane 14 of the optical unit 13 serves as a beam shaping prism for converting a light beam having an anisotropic intensity distribution into a light beam having an isotropic intensity distribution, i.e., converting an elliptic beam into a circular beam.

Figure 4:
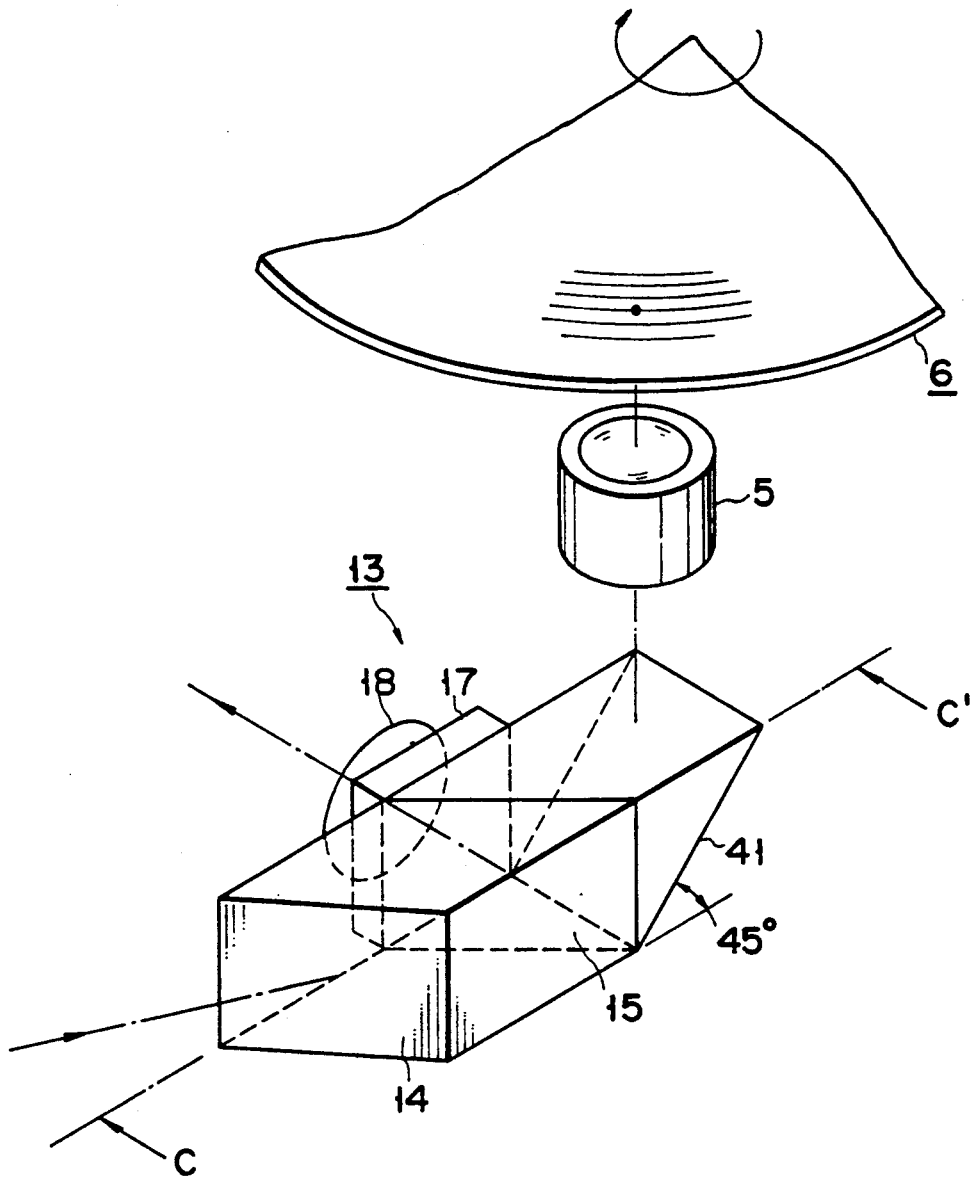
FIG. 4 is a perspective view showing an optical unit arranged along a line C—C' in FIG. 1.
Figure 17:
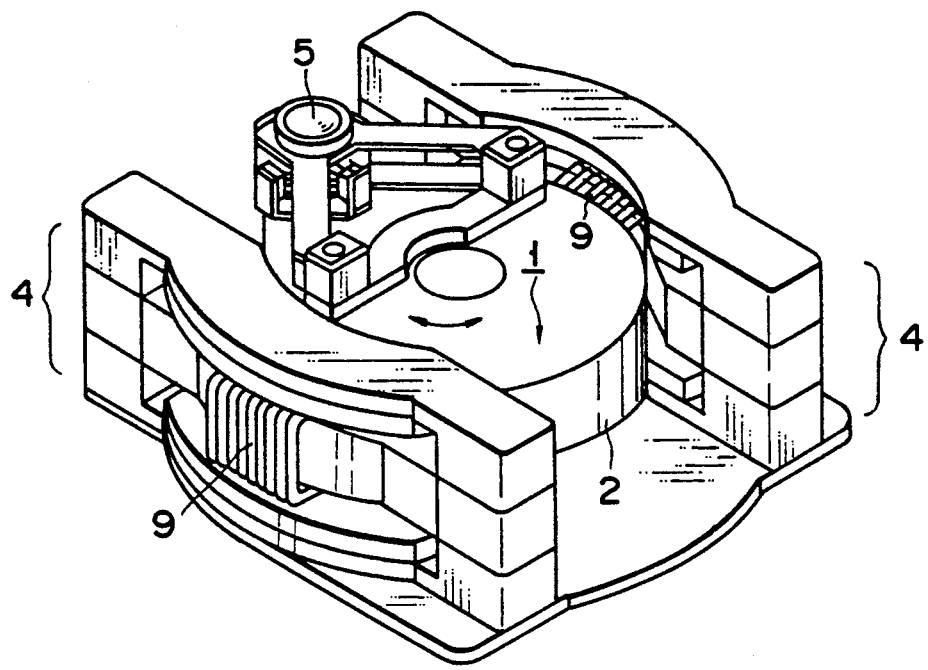
FIG. 17 is a perspective view showing an outer appearance of a rotary-type optical head.

The light beam incident on the optical unit 13 passes through a beam splitter 15 and is totally reflected by a polished reflecting plane 41 which is inclined at 45° (see FIG. 4). The totally reflected light beam is deflected to an objective lens 5 (see FIGS. 4 and 17) arranged above the rotation drum 2. The light beam is then focused by the objective lens 5 to form a small beam spot (see FIG. 2) on a recordable area 27 of an optical disk. The light beam, which forms the beam spot, is further reflected by the recordable area 27.

The light beam reflected by the recordable area 27 is reflected by the beam splitter 15 again through the objective lens 5 and the reflecting plane 41. A halfwave plate 17 and a convergent lens 18 are arranged at the emergence plane, of the optical unit 13, from which a light beam emerges and propagates to a detection optical system. The halfwave plate 17 rotates the plane of polarization of the light beam reflected by the beam splitter 15 through 45° to allow a polarization beam splitter 22 (to be described later) to split the light beam.

The light beam emerging from the convergent lens 18 is converged and reflected by a reflecting plane 43 in a beam splitter 42. As a result, the light beam is deflected through about 90° and is incident on a detecting unit 21. The detecting unit 21 is integrally constituted by the polarization beam splitter 22 and two photodetectors 23 and 24 for respectively detecting a light component reflected by the polarization beam splitter 22 and a light component transmitted therethrough.

In the detection unit 21, a glass portion through which a light beam transmitted through the polarization beam splitter 22 passes is formed to be larger in length than a glass portion through which a light beam reflected by the beam splitter 22 passes. There is a difference in length between the optical paths from the polarization beam splitter 22 to the photodetectors 23 and 24. Therefore, the photodetectors 23 and 24 are located at positions separated from the focal point of the convergent lens 18 by different distances. Each of the photodetectors 23 and 24 has three divided striplike sensor segments which correspond to the spatial frequency axis of a pit string.

Figure 2:
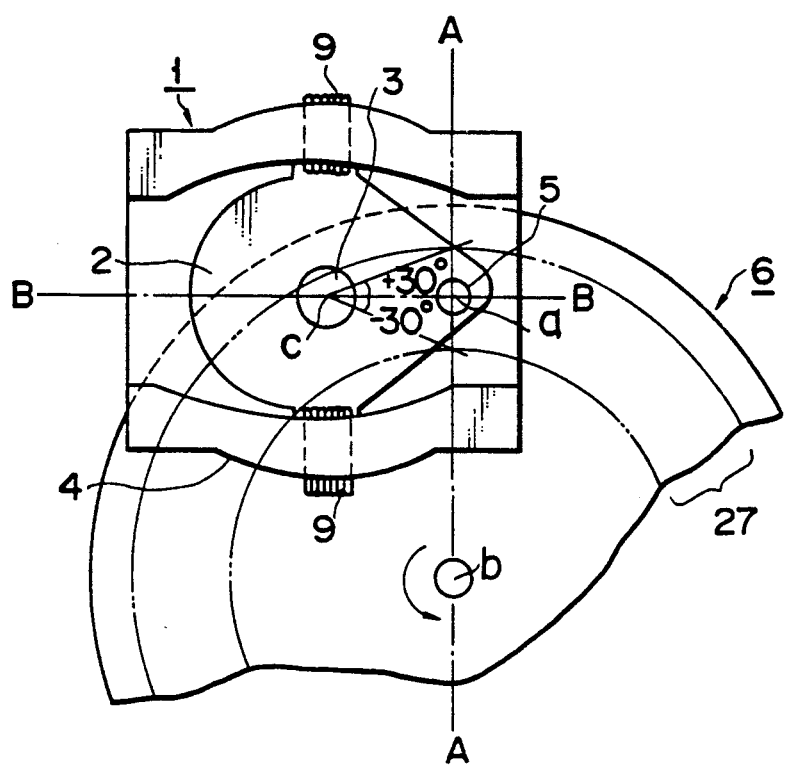
FIG. 2 is a plan view showing the overall arrangement of an optical memory apparatus using the optical head according to the embodiment of the present invention.

As shown in FIG. 2, the rotation drum 2 having the above-described optical systems is integrated with an accessing mechanism 4 to constitute a part of the optical head. A straight line A—A extending through a rotation center b of an optical disk 6 and an optical axis a of the objective lens 5 crosses a straight line B—B' extending through the optical axis a and a rotation center c of the rotation drum 2 at a right angle near the middle portion of the recordable area 27 of the optical disk 6.

The rotation drum 2 arranged in the above-described manner is rotated about the rotation center c by a magnetic driving effect obtained by the accessing mechanism 4 and the coils 9 in such a manner that the objective lens 5 is moved between the inner and outer zone of the recordable area 27. With this rotating operation, tracks in the recordable area 27 are properly selected to detect information signals on the optical disk. In this embodiment, the rotation drum 2 is moved in the recordable area 27 at a rotational angle of 60°.

The optical disk 6 is always rotated at a constant angular velocity. That is, the linear velocity of the optical disk 6 is decreased toward the inner peripheral portion of the disk, and vise versa. Therefore, the length of each pit and the pit intervals are reduced toward the inner zone, and vise versa. With this arrangement, detection of pits becomes increasingly difficult toward the inner zone and at the same time, the degrees of modulation of information reproduction signals are decreased, and vise versa.

Figure 3:
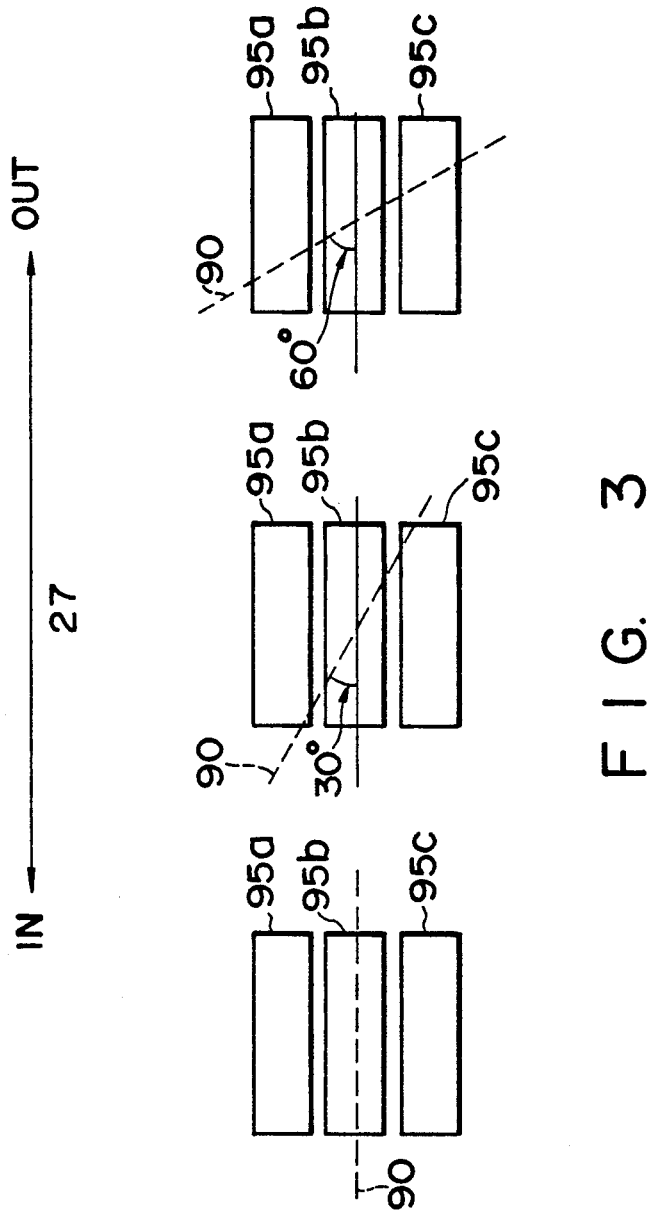
FIG. 3 is a view showing the relative positions of the sensor segments of photodetectors arranged in the optical head in FIG. 1 and the projection of a track projected on the sensor segments.

As shown in FIG. 3, when sensor segments 95a, 95b, and 95c of the photodetectors 23 and 24 are arranged to be parallel with a projection 90 of a track on the inner zone, a bit string no longer crosses split regions. As a result, the optimal frequency characteristics of an information reproduction signal can be obtained from the inner zone, and at the same time, the degree of modulation at the inner peripheral portion, at which a retrieving information signal has the lowest degree of modulation, can be increased. At the outer zone, since the pit length is large and the degree of modulation of each information reproduction signal is high, even if the projection of a track crosses split regions to deteriorate the frequency characteristics of a retrieving information signal, the degree of modulation of the retrieving information signal of the optical information recording/reproducing apparatus as a whole is not much influenced.

A method of detecting a focusing error by using the photodetectors 23 and 24, each having the three divided sensor segments 95a to 95c, will be described below. In each of the photodetectors 23 and 24, a difference in detection value between the sensor segments 95a and 95c on both sides is obtained from a detection value at the middle sensor segment 95b. Thereafter, a difference between the two values from the photodetectors 23 and 24 is obtained. By this processing, a change in shape of a beam on the sensor segments 95a to 95c is detected. As a result, the focusing state of a light beam on the recordable area 27 is detected.

As described above, in the optical head of the present invention, the split regions defined by the three sensor segments of each photodetector are arranged to be parallel with the projection of a track at the inner zone. Therefore, the projection of a track does not cross the split regions at the inner zone. With the above-described structure, a deterioration in frequency characteristics at the inner zone can be prevented. Especially, since the degree of modulation of the reproduction signal at the inner zone, where a reproduction signal has the lowest degree of modulation, can be increased, the degree of modulation of a retrieving information signal of the optical information recording/reproducing apparatus as a whole can be increased. As a result, the reliability of the optical head itself can be improved.

Of the light which is reflected by the recordable area of the optical disk 6 and is incident on the beam splitter 42 through the objective lens 5 and the optical unit 13, the light beam transmitted through the beam splitter 42 is incident on the photodetector 19. The light beam incident on the photodetector 19 is diffracted by grooves (guide grooves) in the optical disk 6. If, for example, the pitch of the tracks on the optical disk 6 is represented by P, and the wavelength of a light beam emitted from the laser diode 11 is represented by λ, the following equation is established on the light receiving plane of the photodetector 19:

$$P\sin\theta = N\cdot\lambda$$

where N is an integer.

The phases of light beams overlap in a direction to satisfy the above equation, and hence the light intensity is increased. In a region where the spots of "0th-order light" and "diffracted light" overlap, the intensity distribution of light is changed by an interference effect due to a tracking error. Therefore, a required tracking error signal can be detected by detecting this change in light intensity distribution. More specifically, the photodetector 19 is divided into two sensor segments, and a difference between outputs from the divided regions is obtained, thus obtaining a tracking error signal. Assume that the optical head 1 is rotated by rotating the rotation drum 2 in FIG. 2 in order to select a track on the optical disk 6. With this rotation, the projection of a track on the photodetector 19 is also rotated, and hence a region where the spots of "0th-order light" and "diffracted light" overlap is rotated within the detection region.

FIGS. 5(a) to 5(c) show how the spots move within the region at this time. More specifically, FIG. 5(a) shows a case wherein the position of the objective lens 5 of the optical head 1, i.e., the radiation position of the light beam, is located on the inner track in the recordable area 27 of the optical disk 6. FIG. 5(b) shows a case wherein the radiation position of a light beam is located on the center track in the recordable area. FIG. 5(c) shows a case wherein the radiation position of a light beam is located on the outer track in the recordable area.

In this manner, as the projection of a track is rotated (moved), especially the spot position of "diffracted light" is changed. As a result, the region where the spots of "0th-order light" and diffracted light overlap is changed. For this reason, as shown in FIG. 7, the detection regions of a photodetector for tracking error signal detection are caused to coincide with the regions where the spots of 0th-order light and "diffracted light" overlap when the objective lens 5 is located at the center track in the recordable area as shown in FIG. 5(b). With this arrangement, if, for example, the objective lens 5 is moved to the inner or outer peripheral portion of the optical disk 6, a tracking error may be detected in spite of the fact that there is no tracking error, thus erroneously detecting a tracking error signal.

Under the circumstances, in the present invention, as shown in FIG. 6, of the light receiving plane of the photodetector 19 for detecting a tracking error signal, hatched regions 31 and 32 are defined as detection regions for detecting a tracking error signal, and other regions are defined as non-detection regions. These detection regions 31 and 32 coincide with a region where the spots of "0th-order light" and "diffracted light" overlap when the objective lens 5 of the optical head 1 is moved from the inner track to the outer track in the recordable area of the optical disk 6 upon rotation of the rotation drum 2. Note that the detection regions may exist only within the region where the spots of "0th-order light" and "diffracted light" overlap, or may exist within a narrower region.

The outputs from the photodetector 19 are input to an operation circuit (i.e., a subtracter) (not shown) to obtain a difference between the outputs from the detection regions 31 and 32, thus obtaining a tracking error signal. Since the detection regions 31 and 32 are set to coincide with the region where the spots of "0th-order light" and "diffracted light" overlap when the position of the objective lens 5 is changed in the recordable area 27, no tracking error signal is obtained as long as a beam spot is located in the center of a track, regardless of the position of the objective lens 5 on the optical disk 6. Assume that a tracking error occurs. In this case, a tracking error signal has a polarity corresponding to the direction of the tracking error and a level corresponding to the amount of the tracking error. As described above, even if the projection of a track on the photodetector 19 changes upon rotation of the rotation drum 2, a proper tracking error signal can be obtained.

Figure 13:
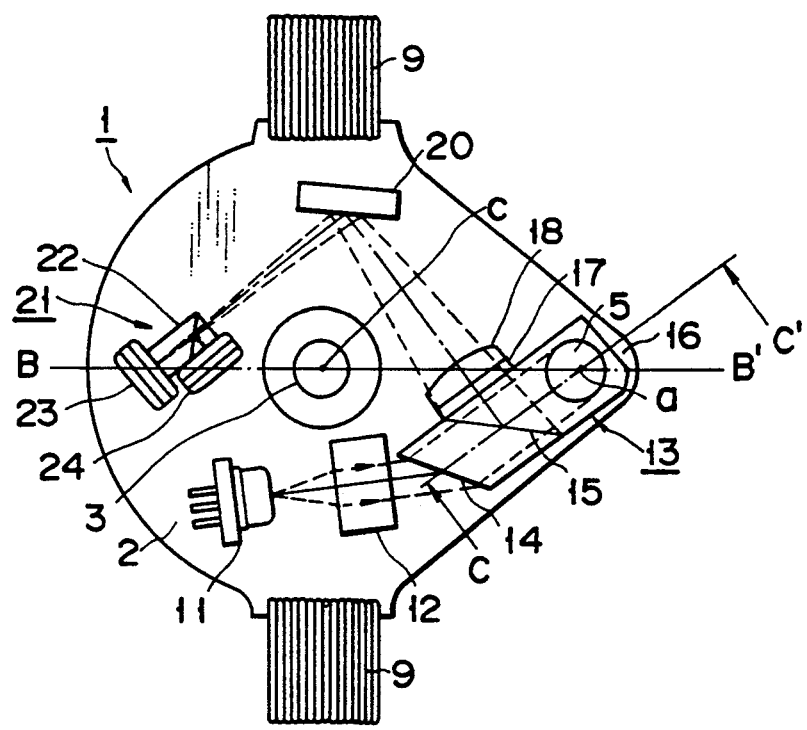
FIG. 13 is a plan view showing an arrangement of an optical head according to another embodiment of the present invention.

FIG. 13 shows a rotating portion of an optical head according to another embodiment of the present invention. The main difference between this embodiment and the preceding embodiment is that the reflecting plane 41 of the optical unit 13 in FIG. 1 is replaced with a second beam splitter 16, and the beam splitter 42 in FIG. 1 is replaced with a reflecting mirror 20. Since other parts in FIG. 13 are identical to these shown in FIG. 1, the same reference numerals in FIG. 13 denote the same parts as in FIG. 1, and a detailed description thereof will be omitted.

In this embodiment, light emitted from a laser diode 11 is incident on an optical unit 13 through a collimating lens 12 and is transmitted through a first beam splitter 15. The transmitted light is then reflected by the second beam splitter 16 (see FIG. 14) and is incident on an objective lens 5, thus forming a small beam spot on the recording layer of an optical disk 6. The light reflected by the recording layer of the optical disk 6 is incident on an optical layer unit 13 through the objective lens 5. Most of the light is reflected by the beam splitter 16 and also reflected by the beam splitter 15. Sequentially passing through a halfwave plate 7 and a convergent lens 18, the light converges and is reflected by the reflecting mirror 20 to be incident on a detection unit 21. The detection unit 21 has the same arrangement as that in the preceding embodiment.

Meanwhile, the light transmitted through the beam splitter 16 is incident on a photodetector 19 for tracking error detection. The photodetector 19 has the same arrangement as that in the preceding embodiment. The detection regions of the photodetector 19 are set within regions where the spots of 0th-order light and diffracted light from the optical disk 6 overlap when the objective lens 5 of an optical head 1 is moved from the inner track to the outer track in the recordable area of the optical disk 6 upon rotation of a rotation drum 2. Similar to the preceding embodiment, therefore, in this embodiment, a proper tracking error signal can always be obtained even if the rotation drum 2 is rotated.

FIGS. 8(a) to 8(c) show the detection regions of a photodetector for detecting a tracking error signal, which is used for an optical head according to an embodiment of the present invention.

Figure 14:
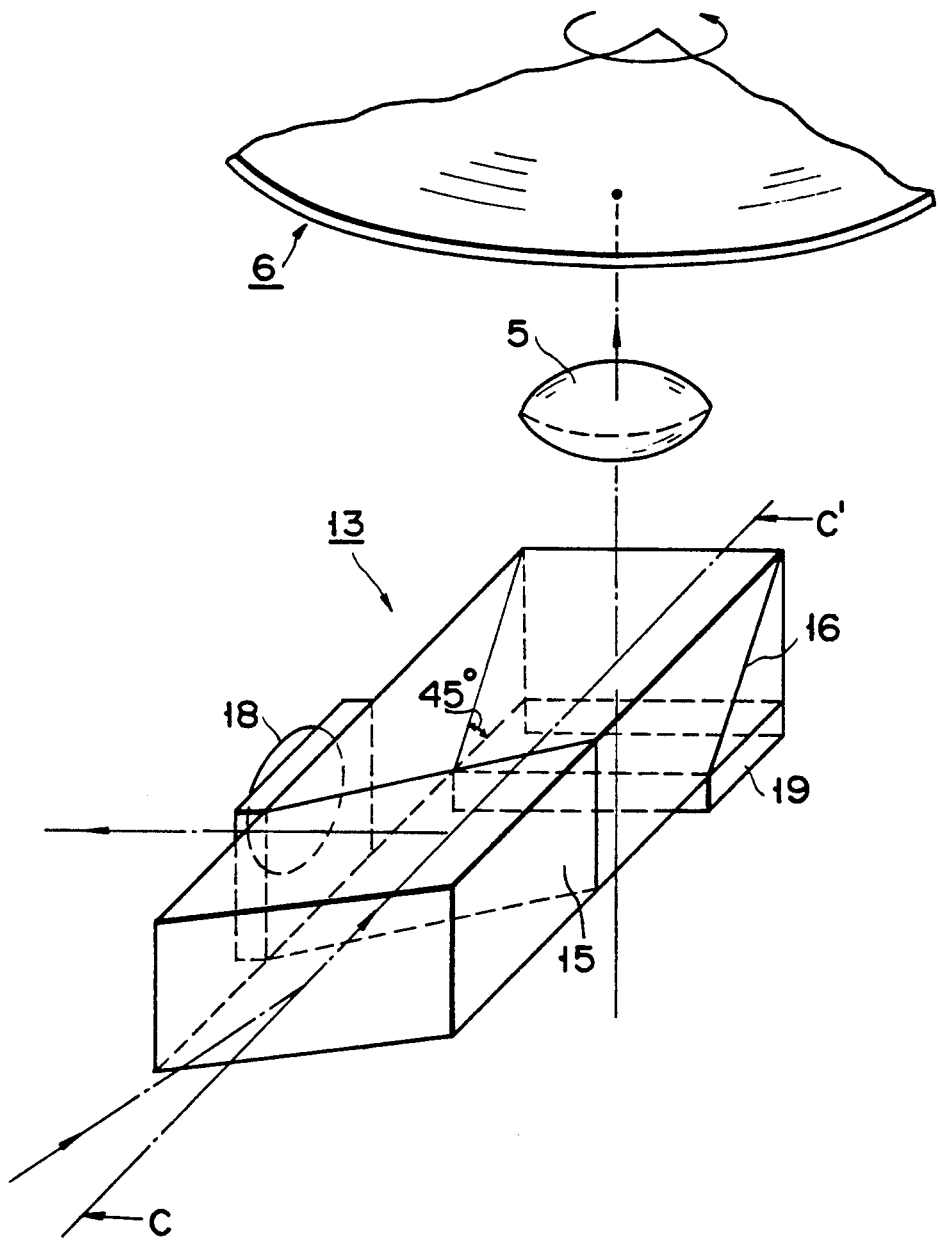
FIG. 14 is a perspective view showing an optical unit arranged along a line C—C' in FIG. 13.
Figure 15A:
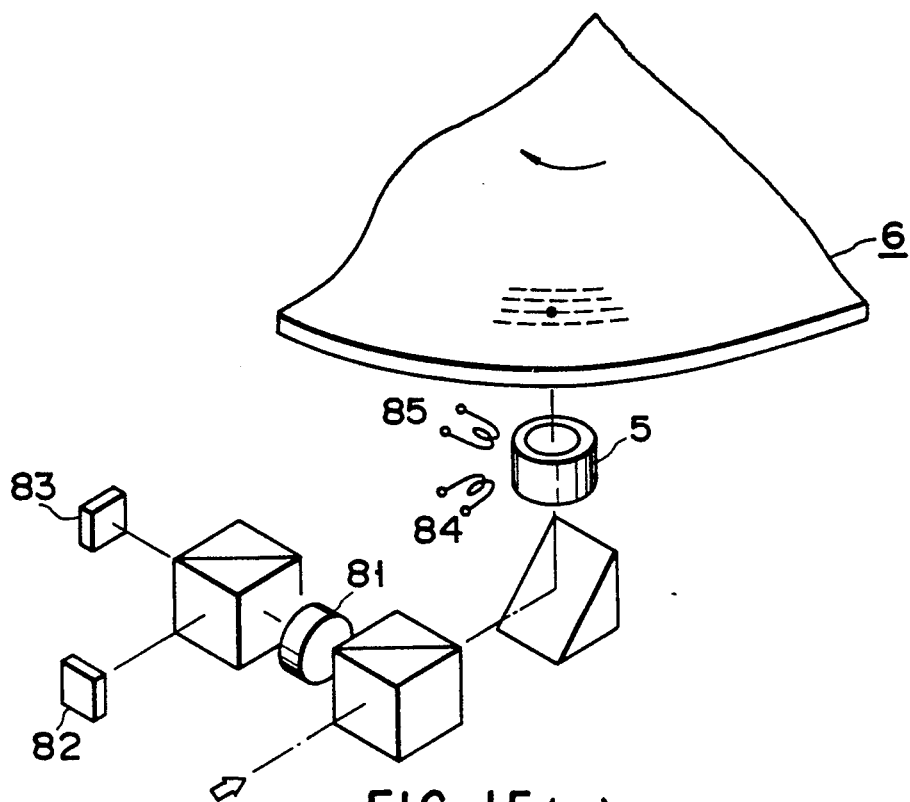
FIGS. 15(a) and 15(b) are views showing the relative positions of the sensor segments of each conventional photodetector and the projection of a track projected on the sensor segments.
Figure 15B:
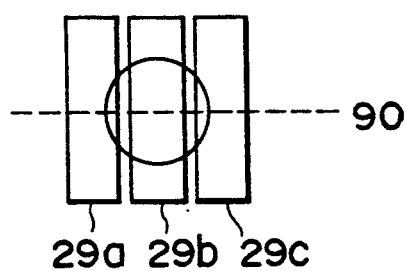
Figure 16:
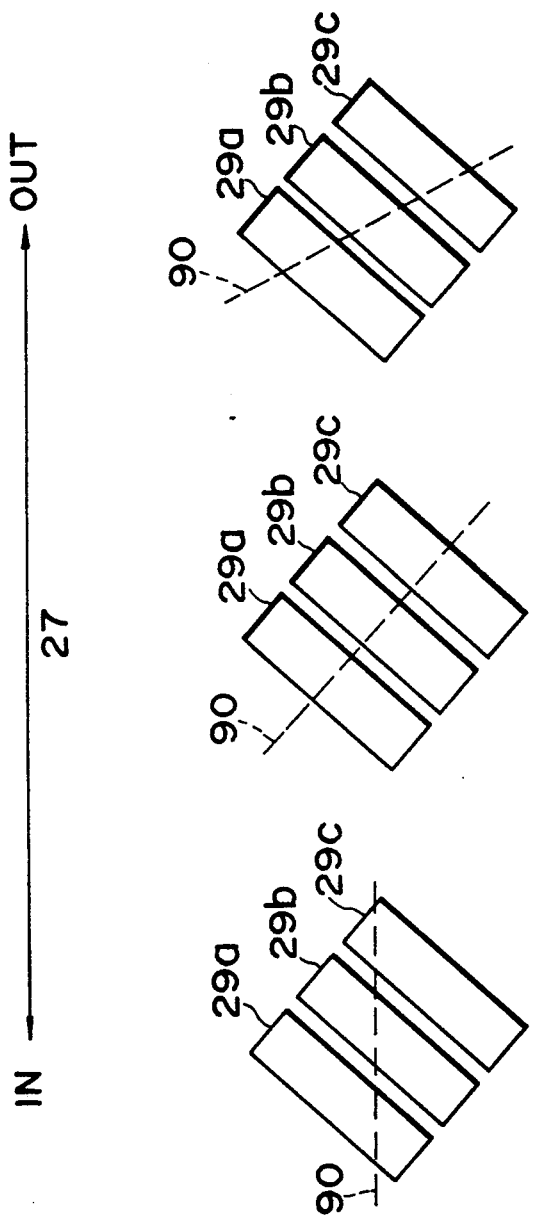
FIG. 16 is a view showing the relative positions of the sensor segments of conventional photodetectors and the projection of a track projected on the sensor segments.

In this embodiment, a photodetector 19 for detecting a tracking error signal, which is identical to these shown in FIGS. 13, 14, and 1, has a plurality of sensor segments radially divided from its center, as shown in FIG. 8. The sensor segments of the photodetector 19 are selectively used in accordance with a change in radiation position of a light beam on the optical disk 6 upon rotation of the optical head. A detection error caused by the rotation of the optical head can be reduced by detecting light beams incident on the corresponding sensor segments. The radiation position of a light beam on the optical disk 6 can be determined by detecting an address signal which is recorded on the optical disk 6 in advance.

Figure 9:
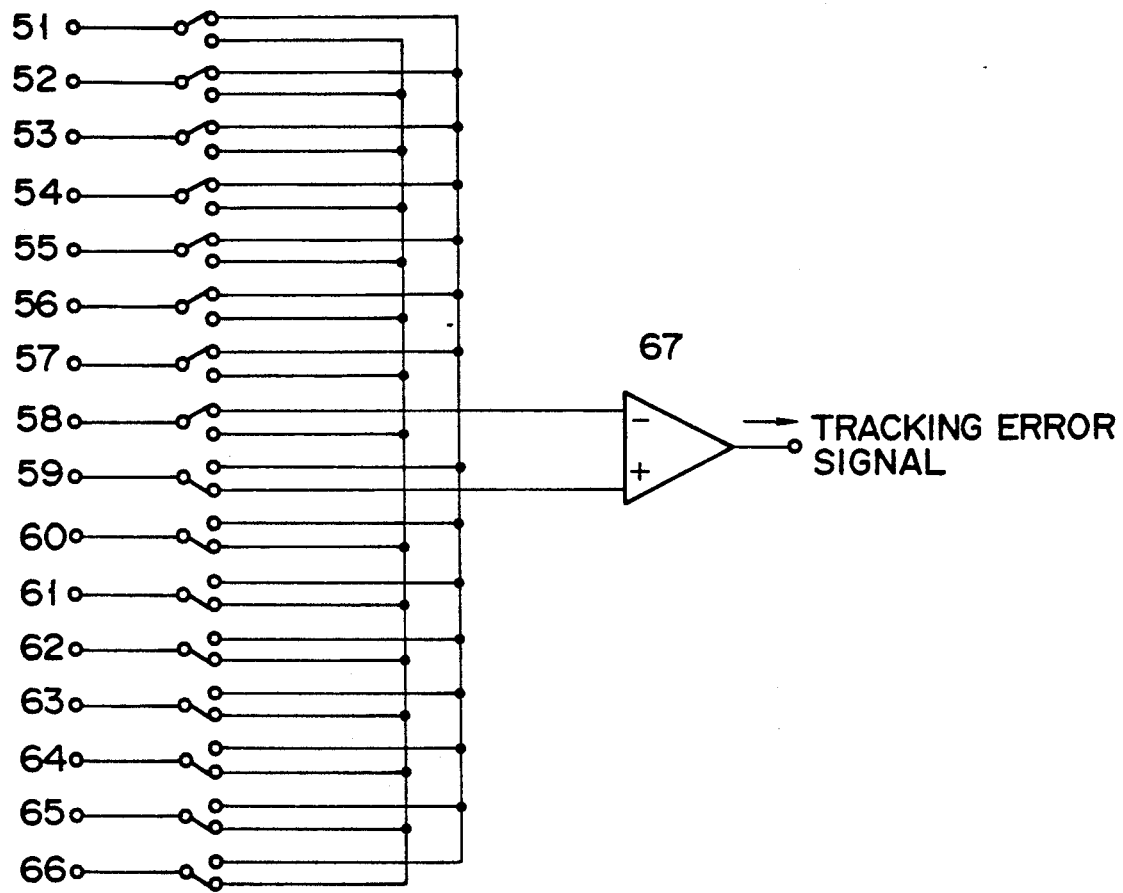
FIG. 9 is a schematic circuit diagram showing a tracking operation circuit connected to the photodetector in FIG. 8(a) to 8(c)

The outputs from the photodetector 19 are input to a tracking operation circuit (i.e., a subtracter) shown in FIG. 9, and a tracking error signal is obtained by calculating a difference between the outputs from two detection regions. Assume that the detection region of the photodetector 19 is located on the inner track of the optical disk, as shown in FIG. 8(a). In this case, after switches 51 and 59 of the tracking operation circuit shown in FIG. 9 are operated, a difference between outputs from the left and right regions defined by the boundaries between detection regions 51 and 52 and between detection regions 59 and 60 is calculated, thus obtaining a tracking error signal.

The two detection regions are set in the regions where the spots of "0th-order light" and "diffracted light" overlap in accordance with a change in position of the objective lens 5. Therefore, since no offset occurs in a tracking error signal regardless of the position of the objective lens 5 on the optical disk 6, a proper tracking error signal can be obtained.

FIG. 10 shows a tracking operation circuit according to another embodiment of the present invention. Since parts other than this tracking operation circuit are the same as those in the preceding embodiment, they are omitted. In the preceding embodiment, predetermined switches of the tracking operation circuit are operated in accordance with the position of a beam spot on the optical disk 6. However, the tracking operation circuit includes unnecessary switches which need not be operated even if the optical head is rotated from the inner track to the outer track on the optical disk 6. Therefore, the unnecessary switches which need not be operated in practice can be omitted from the circuit as in the tracking operation circuit of this embodiment shown in FIG. 10. That is, a simple tracking operation circuit shown in FIG. 10 can effectively operate.

FIG. 11 shows the detection regions of a photodetector for tracking error detection according to another embodiment of the present invention. Since portions other than the detection regions of a photodetector 19 for tracking error detection and a tracking operation circuit are the same as those in the preceding embodiment, they are omitted. In the preceding embodiment, the detection region of the photodetector 19 is radially divided into the plurality of sensor segments, and the switches of the tracking operation circuit are operated in accordance with the position of a beam spot on the optical disk 6. However, there are switches which need not be operated even if the optical head is rotated from the inner track to the outer track on the optical disk. In addition, all the detection region of the photodetector 19 need not be divided. Therefore, division of detection regions which need not be switched may be omitted, as in the detection regions of the photodetector 19 for tracking error detection shown in FIG. 11. With this arrangement, the tracking operation circuit can be simplified, as shown in FIG. 12.

The present invention is not limited to the embodiments described above. Various changes and modifications can be made within the spirit and scope of the invention. For example, in the above-described embodiments, as a means for changing the detection region of the photodetector in accordance with the rotation of the optical head, the method of dividing the detection region of the photodetector into a plurality of regions and switching the detection regions is employed. However, the same effect can be obtained by rotating the photodetector in accordance with the rotation of the optical head. In addition, according to the above embodiments, in the focus detecting and retrieving information signal detecting optical systems, a focusing error signal and a retrieving information signal are detected by using the halfwave plate 17, the polarization beam spitter 22, the two photodetectors 23 and 24. However, other known detection optical systems can be used in accordance with the recording form (the physical state of the recording layer) of an optical disk to be used.

Furthermore, the gist of the present invention is that in an optical head for accessing tracks by rotational movement across the tracks, the structure and arrangement of photodetectors for detecting tracking error signals are devised to obtain an accurate tracking error signal. Therefore, various modifications can be made within the gist of the present invention.

In the above-described optical head of the present invention, the following effects can be obtained.

As the optical head selects a track while rotating between the inner and outer peripheral portions of an optical disk, the projection of a track projected on the photodetectors is also rotated. Since the photodetectors are arranged such that the projection of the inner track does not cross the insensitive or dead regions between the three divided sensor segments, a deterioration in frequency characteristics of retrieving information signals at the split regions of the photodetectors on the inner peripheral portion can be minimized, thus reproducing accurate pit information from the optical disk. More specifically, since the three split regions or sensor segments of each photodetector are arranged to be parallel with the projection of a track on the inner peripheral portion, the projection of the track does not cross the split regions on the inner peripheral portion. This prevents a deterioration in frequency characteristics at the inner peripheral portion. Since the degree of modulation of the reproducing signal at the inner peripheral portion where the degree of modulation of a reproducing signal is minimized, the degree of modulation of the retrieving information signal of the overall optical memory apparatus can be improved. As a result, the reliability of the optical head can be improved.

Furthermore, the spots of "0th-order light" and "diffracted light", of light reflected by an optical disk, which are caused by grooves in an optical disk overlap regardless of the position of the rotating member within the rotation range, i.e., regardless of a track on the optical disk on which an optical beam is radiated. Therefore, a tracking error signal can be accurately detected regardless of the rotation of the projection of a track on each photodetector upon rotation of the rotary-type optical head, thus allowing the optical memory apparatus to perform a recording/reproducing operation.

Even if, therefore, the projection of a track on each photodetector is rotated upon rotation of the optical head, when, for example, a tracking error is zero, no tracking error signal is detected, thus obtaining a proper tracking error signal which changes in accordance with only a tracking error.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head comprising:
   a rotating member arranged to be rotatable in a direction to cross tracks formed on an optical disk;
   means for radiating and focusing a light beam on the optical disk;
   a photodector for detecting a tracking error signal representing a tracking error of the light beam with respect to the optical disk; and
   means for guiding light reflected by the optical disk into said photodetector,
   wherein regions where beam spots of "0th-order light" and "diffracted light" of the reflected light on said photodetector overlap in accordance with rotation of said rotating member are used as detection regions for detecting the tracking error signal.

2. An optical head according to claim 1, wherein said photodetector is arranged behind a reflecting mirror for transmitting a half of the reflected light of the focused light beam and reflecting a remaining half of the light at a predetermined angle.

3. An optical head according to claim 1, wherein said rotating member is arranged in a direction perpendicular to a center line extending through said radiating means and a rotation center of said rotating member, rotated about the rotation center and moves between an inner track and an outer track in the recordable area on the optical disk, and arranged to be freely rotated within a range of 30° in right and left directions of the optical disk, respectively, with respect to the center line perpendicular to a center track in the information recording area.

4. An optical head comprising:
 a rotating member arranged to be rotatable in a direction to cross tracks formed on an optical disk;
 means for radiating and focusing an incident light beam on the optical disk which is reflected off of the optical disk;
 a photodetector
 means for guiding the light reflected off of the optical disk onto said photodector;
 said photodetector having a plurality of detection regions for detecting overlapping of "0th-order light" and "diffracted light" of the reflected light as said rotating member rotates, each detecting region having an output for generating a detection signal;
 an operation circuit having inputs; and
 a switching means selectively connecting the outputs of the detection regions of said photodetector to the inputs of the operation circuit;
 said operation circuit for generating a tracking error signal by determining a difference between detection signals output by outputs of said detection regions which are selectively connected to said operation circuit by said switching means.

5. An optical head according to claim 4, wherein the plurality of detection regions are obtained by radially dividing a detection region of said photodetector from a center thereof.

* * * * *